United States Patent Office 2,695,310
Patented Nov. 23, 1954

2,695,310

PREPARATION OF GUANIDINIUM MERCAPTOALKANESULFONATE

Charles H. Schramm, Wellesley, and Roy H. Karlson, Newtonville, Mass., assignors to Lever Brothers Company, New York, N. Y., a corporation of Maine No Drawing. Application December 12, 1951, Serial No. 261,378

25 Claims. (Cl. 260—501)

This invention relates to certain novel compounds and to novel processes for their preparation.

It is an object of our invention to prepare new and useful sulfur- and nitrogen-containing organic compounds by means of the novel processes described more fully hereinafter. The compounds of the invention are prepared by a novel combination of steps, some of which are also novel. The compounds, which result from the different steps will be described more fully hereinafter. The novel compounds are all useful as intermediates for the preparation of other compounds.

The general reactions and the compounds produced thereby may be seen from the following equations:

(1) $\quad X(CH_2)_nX + Me_2SO_3 \longrightarrow X(CH_2)_nSO_3Me + MeX$
  di-haloalkane $\qquad\qquad\qquad$ haloalkane-sulfonate (2)
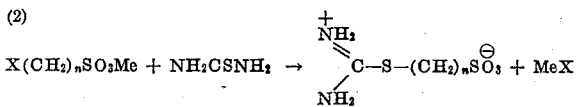
haloalkane-   thiourea   S-thiuronium
 sulfonate              alkanesulfonate (3)
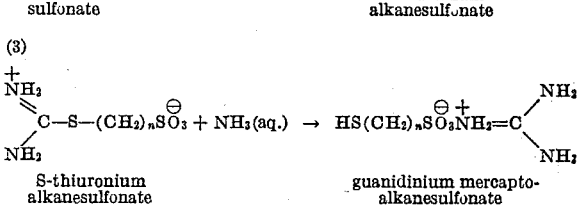
S-thiuronium $\qquad\qquad$ guanidinium mercapto-
alkanesulfonate $\qquad\qquad\quad$ alkanesulfonate where X is a halogen, preferably bromine or chlorine, $n$ is a small whole number between 1 and 5, preferably 2, and Me is an alkali metal preferably sodium. For convenience, the process will be further referred to as illustrative when X is bromine, $n$ is 2, and Me is sodium.

It will be appreciated that any water-soluble sulfite may be employed in Reaction 1 in place of the metal sulfite shown above. Due to certain economic factors, sodium or potassium sulfite is usually employed. The water-soluble metal metabisulfites, such as sodium metabisulfite, may also be used in place of the sulfite in Reaction 1. However, in the latter cases, it is necessary to add a mole of the metal hydroxide, such as sodium hydroxide, per mole of metabisulfite. It has been found advisable not to add the sulfite in greater than stoichiometric quantities to the Reaction 1 since the presence of excess sulfite favors the formation of undesirable disulfonates.

Furthermore, amine compounds, other than ammonia, such as methylamine, monoethanolamine, etc., may be used in Reaction 3 above. In such cases the product will, of course, be the corresponding substituted guanidinium mercaptoalkanesulfonate.

Reaction 1 has been described in the literature in an article by I. M. Lipovich, J. Applied Chem. (USSR) 18, 718–24 (1945); Chem. Abs. 40, 6407 (1946). In this experiment, the investigator purified a resulting bromoethanesulfonate compound and converted it with sodium hydrogen sulfide (NaSH) to the sodium 2-mercaptoethanesulfonate. In an example employing the haloethanesulfonate in accordance with our invention, we do not employ sodium hydrogen sulfide but rather react the sodium haloethanesulfonate salt with thiourea. This process is believed to be novel. We have found that by reacting the sodium haloethanesulfonate with thiourea as in Reaction 2 above, the inner salt β-S-thiuronium ethanesulfonate is formed, together with the metal halide salt from which it may be separated to obtain pure β-S-thiuronium ethanesulfonate. The reaction is promoted by heating a solution of the two reactants in any inert reaction medium such as water, preferably in about molal proportions, at a temperature of from 150° F. up to a gentle boil for a period between about one and three hours and allowing the solution to stand, generally for several hours at room temperature or lower to permit the crystalline precipitate of the β-S-thiuronium ethanesulfonate to deposit from the solution. The β-S-thiuronium ethanesulfonate may be purified by recrystallization from water or other solvent. The purified β-S-thiuronium ethanesulfonate product does not possess a sharp melting point but decomposes upon heating to 265° C. The β-S-thiuronium ethanesulfonate is then reacted with aqueous ammonia as in Reaction 3 above to form the pure single product of guanidinium β-mercaptoethanesulfonate which is believed to be a novel compound. The reaction is promoted by heating the reactants in substantially molal proportions on a steam bath to promote an exothermic reaction. A temperature of 105 to 150° F. may be used and the time required is about one to three hours. Any inert solvent, preferably water, may be used. The reaction mixture is concentrated preferably under vacuum after standing for several hours and the residue crystallizes on cooling. The white salt may be recrystallized from anhydrous alcohol to give a white crystalline product with a melting point of 169–172° C.

The literature contains examples of treatment of bromides and iodides of thiuronium compounds with ammonia or amines to yield mercaptans and guanidines. This is to be distinguished from the reaction of thiuronium compounds of the inner-salt type such as β-S-thiuronium ethanesulfonate in accordance with the invention. We have found that the reactions reported heretofore do not occur when the inner salt is used; but, on the other hand, a novel reaction is obtained which produces a single addition product containing a guanidinium radical, not previously prepared.

The guanidinium compound is especially useful as an intermediate in the preparation of other chemical compounds, and due to the fact that it is formed by the present process without any contaminating impurities or extraneous products, the preparation and recovery of its derivatives are greatly simplified. In most instances, the resulting guanidinium compound may be used as formed in the reaction without further purification.

The guanidinium mercaptoalkanesulfonate product of Reaction 3 above may be converted to the corresponding salts of other bases by one of several methods. For example, it may be converted by means of the double decomposition with a nitrate salt such as ammonium or sodium nitrate, taking advantage of the low solubility of guanidine nitrate which is formed by the double decomposition reaction in which the guanidinium radical of the guanidinium sulfonate salt is replaced. However, a more satisfactory process which also permits the preparation of the free sulfonic acid is by means of a cation resin exchange treatment in which an aqueous solution of guanidinium mercaptoalkanesulfonate is passed through a cation exchange resin whereby the guanidinium ion is replaced by a hydrogen ion to form mercaptoalkanesulfonic acid in accordance with the reaction:

(4)
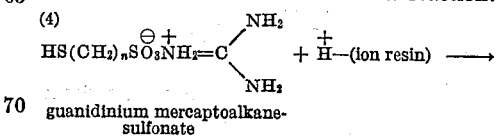
guanidinium mercaptoalkane-
 sulfonate

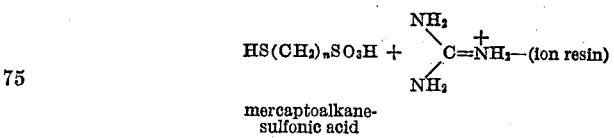
mercaptoalkane-
 sulfonic acid where $n$ is a whole number.

Any cation exchange resin possessing strongly acid groups is satisfactory for use in converting the guanidinium sulfonate salt into the corresponding sulfonic acid. Examples of suitable cation resin exchange materials are the nuclear sulfonic type cation resins such as the commercial Amberlite IR–120, Amberlite IR–100, and Dowex–50 which are commercially available on the market.

The mercaptoalkanesulfonic acid obtained will be extremely pure, an important factor because the oxidation of mercaptans is catalyzed by the presence of small amounts of impurities. The acid can be used directly in the preparation of derivatives of the sulfonic acid. For example, the sulfonic acid may be reacted with various basic compounds to form the corresponding salts. For example, mercaptoethanesulfonic acid can be reacted with monoethanolamine in an addition reaction to prepare monoethanolamine β-mercaptoethanesulfonate as follows:

In a similar addition reaction β-mercaptoethanesulfonic acid can be reacted with ethylamine to form the corresponding ethylamine β-mercaptoethanesulfonate as follows:

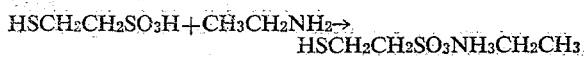

The mercaptoalkanesulfonic acids can also be reacted with mineral bases to form corresponding salts of the sulfonic acid by a substitution reaction. One example thereof is the reaction of sodium hydroxide with β-mercaptoethanesulfonic acid to prepare sodium β-mercaptoethanesulfonate as follows:

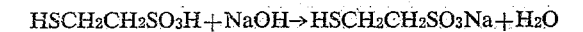

Similarly ammonium hydroxide can be reacted with β-mercaptoethanesulfonic acid to prepare ammonium β-mercaptoethanesulfonate by the following reaction:

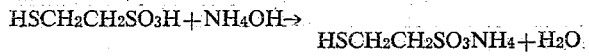

In all of the above reactions the mercapto-ethanesulfonic acid is employed as illustrative. The other mercaptoalkanesulfonic acids described herein may also be prepared similarly together with their derivatives above described.

It will be appreciated also that the salts of the alkanesulfonic acids can be prepared directly from the guanidinium mercaptoalkanesulfonates by passing this latter compound through cation exchange resins possessing in place of the reactive hydrogen ion some other labile cation group.

The utility of the present invention in preparing the novel compounds and their derivatives as described above is readily apparent. The compounds in each instance are easily obtained very pure and where purification is required, it is a simple matter of recrystallization from a suitable solvent such as water or alcohol. A comparison, for example, of the preparation of the sodium β-mercaptoethanesulfonate salt from the pure guanidinium β-mercaptoethanesulfonate salt as described above is much simplified over the process for obtaining the same sodium sulfonate salt by the method described in the Lipovich article above. The following examples are illustrative of the present process but are not intended to be limiting thereof:

EXAMPLE 1

β-S-thiuronium ethanesulfonate.—A 12-liter 3-necked flask was filled with 2460 g. of ethylene dibromide, 5000 cc. of 95% ethyl alcohol and 1800 cc. of water. The mixture was heated to a vigorous reflux and while being stirred, there was added a solution of 500 g. of sodium sulfite in 1800 cc. of water over a period of 3 hours. The refluxing was continued until the reaction was substantially complete. At the end of this time, the mixture was distilled until 5 liters of solution had been removed. 1500 g. of ethylene dibromide was recovered from the distillate. The residual solution was poured into large evaporating dishes and taken to dryness on the steam bath. From this there was obtained 1182 g. of white crystalline material of sodium β-bromoethanesulfonate containing 32.8% sodium bromide.

Six hundred grams of the sodium β-bromoethanesulfonate-sodium bromide mixture, 155 g. of thiourea, and 500 cc. of water were heated in a 2-liter beaker on an electric hot plate until solution was effected. A hot filtration removed suspended extraneous material after which the clear solution was heated to a gentle boil for an additional hour. At the end of this time the solution was allowed to stand at room temperature overnight. In this way, there was obtained 230 g. of β-S-thiuronium ethanesulfonate as a crystalline precipitate, which was recrystallized from water. This represents a 65% yield based on ethylene dibromide. The compound does not possess a sharp melting point but was decomposed upon heating to 265° C.

The above experiment was repeated with satisfactory results by placing the same total quantities of ethylene dibromide, alcohol, water, and sodium sulfite together in the flask and refluxing the mixture for one hour and then allowing the reaction mixture to distill until the residual solution was concentrated to 1½ liters. The unreacted ethylene dibromide was recovered from the distillate.

EXAMPLE 2

Guanidinium β-mercaptoethanesulfonate.—Two hundred and thirty grams of β-S-thiuronium ethanesulfonate was placed in a 1-liter round-bottom flask. To this there was added 500 cc. of concentrated aqueous ammonia, and the reaction mixture was heated on the steam bath. An exothermic reaction ensued within a short time at which point the reaction was removed from the steam bath and allowed to stand at room temperature. After standing for 2 hours, the solution was concentrated in vacuum until all of the water had been removed. The residue crystallized upon cooling and the white solid was recrystallized from anhydrous alcohol. The yield of dried product was 118 g. with a purity of 96.5% as determined by SH content. This represents a 30% yield based upon sodium sulfite. An additional 69 g. of material with a purity of 76% was recovered from the filtrate. This gives a total yield of 187 g. or 48% based upon sodium sulfite. The melting point of the pure material was 169–172° C.

EXAMPLE 3

β-Mercaptoethanesulfonic acid.—One hundred grams of β-S-thiuronium ethanesulfonate prepared as in Example 1 was reacted with 200 cc. of concentrated aqueous ammonia as in Example 2. The excess ammonia was removed under vacuum, and the aqueous solution of guanidinium β-mercaptoethanesulfonate was poured into an Amberlite IR–120 ion exchange resin operating in its acid cycle. After washing the column with water to remove the last traces of product, the aqueous effluates were combined and evaporated in vacuum until all water had been removed from the product. β-Mercaptoethanesulfonic acid was obtained as a clear viscous syrup. Yield 77 g. with a purity of 96% by —SH titration.

EXAMPLE 4

β-S-thiuronium ethanesulfonate.—The experiment of Example 1 was repeated with the modification that after completion of refluxing, the solution was concentrated to 1½ liters. This solution was reacted directly with 306 grams of thiourea. After standing overnight, 415 grams of β-S-thiuronium ethanesulfonate were recovered. The proportions of material used in this experiment are found to be most desirable inasmuch as the maximum amount β-S-thiuronium ethanesulfonate is recovered contaminated with a minimum amount (about 0.2%) sodium bromide. The use of more water than specified results in a decreased yield of β-S-thiuronium ethanesulfonate while more concentrated solutions tend to increase the sodium bromide content. Under the preferred reaction condition, the reaction product may be used directly without purification in the preparation of the sulfonic acid as in Example 3 and in the production of derivative products.

EXAMPLE 5

β-Mercaptoethanesulfonic acid.—2100 grams of β-S-thiuronium ethanesulfonate were placed in a solution of 2100 cc. of concentrated aqueous ammonia and 400 cc. of water. The mixture was carefully warmed on a steam bath and an exothermic reaction ensued, at which point the β-S-thiuronium ethanesulfonate passed into solution. After standing for two hours at room temperature, the solution was concentrated until all of the excess ammonia had been removed.

The resultant clear solution from the ammonolysis reaction was processed through "Amberlite IR-120" ion exchange resin and converted into β-S-mercaptoethanesulfonic acid in 93.7% yield (based on β-S-thiuronium ethanesulfonate).

It is expedient not to heat the reaction mixture rapidly since this increases the loss of ammonia and effects an incomplete reaction. Heating the mixture too rapidly may retard the ammonolysis reaction entirely. The amount of ammonia used is considered to be a satisfactory minimum and larger quantities of ammonia are not found to have any beneficial effect on the reaction. It is also expedient to remove the excess ammonia before processing the guanidinium β-mercaptoethanesulfonate solution through the ion exchange resin since the resin will also remove the ammonia with the result that the capacity of the resin for the exchange of guanidinium ions will be reduced.

Although the preparation of β-mercaptoethanesulfonic acid through the ammonolysis reaction is the preferred method, it is also possible to prepare the sulfonic acid by the sodium hydroxide hydrolysis of β-S-thiuronium ethanesulfonate followed by the ion exchange treatment. The resulting acid, however, is generally not as satisfactory as that prepared by the ammonolysis reaction.

EXAMPLE 6

β-S-thiuronium ethanesulfonate.—In another experiment similar to Example 1, 1300 grams of ethylene dichloride were reacted with 625 grams of potassium sulfite in a solution of 5000 cc. of 95% ethyl alcohol and 3600 cc. of water. From this reaction, there was obtained a 65% yield of potassium β-chloroethanesulfonate. A concentrated solution (1½ liters) of the reaction mixture was mixed with thiourea and heated with water until solution was effected. The solution was gently boiled for an additional hour and allowed to stand at room temperature overnight. Crystalline β-S-thiuronium ethanesulfonate was isolated from the reaction mixture in 41% over-all yield based on the potassium sulfite.

EXAMPLE 7

Monoethanolammonium β-mercaptoethanesulfonate.—Thirty-six grams of guanidinium β-mercaptoethanesulfonate were dissolved in 75 cc. of water. This aqueous solution was processed through an Amberlite IR-120 ion exchange resin operating in its acid cycle. The ion column was thoroughly washed with additional quantities of water in order to remove the residual material in the column as in Example 3. The effluent acidic solution containing β-mercaptoethanesulfonic acid was neutralized with monoethanolamine. Vacuum concentration of the aqueous solution yielded the pure monoethanolammonium β-mercaptoethanesulfonate as a clear colorless syrup. The yield was 30 g.

EXAMPLE 8

Ethylammonium β - mercaptoethanesulfonate. — An aqueous solution containing 21 g. of β-mercaptoethanesulfonic acid was neutralized with 6.6 g. of ethylamine. The product after vacuum concentration was obtained as a semi-crystalline solid.

EXAMPLE 9

Ammonium β-mercaptoethanesulfonate.—Twenty-one grams of β-mercaptoethanesulfonic acid were neutralized with 5.1 g. of ammonium hydroxide as above. A quantitative yield of ammonium β-mercaptoethanesulfonate was obtained. After recrystallization from alcohol the material melted at 158.5–163.5° C.

EXAMPLE 10

Sodium β - mercaptoethanesulfonate.—Twenty - one grams of β-mercaptoethanesulfonic acid were converted into the sodium salt by neutralization with sodium hydroxide. This compound after recrystallization from ethyl alcohol did not possess a melting point upon heating to 250° C.

EXAMPLE 11

Ammonium β - mercaptoethanesulfonate. — Twenty grams of guanidinium β-mercaptoethanesulfonate was dissolved in 10 cc. of water and to this was added 8 grams of ammonium nitrate in a solution of 5 cc. of water. A precipitate of guanidine nitrate was filtered and the ammonium β-mercaptoethanesulfonate was recovered from the filtrate.

EXAMPLE 12

Sodium β-mercaptoethanesulfonate.—The procedure of the previous example was repeated except that 8.5 grams of sodium nitrate is employed instead of ammonium nitrate.

It will be obvious that our invention may be modified in accordance with the practices known to those skilled in the art. The above description is intended to set forth the best mode of practicing our invention and not as limitative thereof except as required by the following claims.

We claim:

1. A process for the preparation of S-thiuronium alkanesulfonate which comprises reacting an alkylene dihalide with an alkali metal sulfite at an elevated temperature, removing unreacted dihalides, adding thiourea, heating until solution is effected, allowing the reaction mixture to stand, and recovering a crystalline precipitate of said S-thiuronium alkanesulfonate.

2. A process for the preparation of β-S-thiuronium ethanesulfonate which comprises reacting ethylene dihalide with an alkali metal sulfite at refluxing temperature, removing unreacted halide, adding thiourea, heating until solution is effected, allowing the reaction mixture to stand at room temperature, and recovering a crystalline precipitate of said β-S-thiuronium ethanesulfonate.

3. A process of preparing S-thiuronium alkanesulfonate which comprises reacting a haloalkane sulfonate with thiourea.

4. A process for the preparation of guanidinium mercaptoalkanesulfonate which comprises reacting an alkylene dihalide with an alkali metal sulfite, removing unreacted dihalide, adding thiourea, heating the second mixture again until reaction is effected to form S-thiuronium alkanesulfonate, adding concentrated aqueous ammonia and heating the mixture, concentrating the solution, and recovering said guanidinium mercaptoalkanesulfonate.

5. A process for the preparation of guanidinium β-mercaptoethanesulfonate which comprises reacting ethylene dihalide with an alkali metal sulfite in an alcohol-water solution, refluxing the mixture, removing unreacted dihalide, adding thiourea, heating the second mixture again until the solution is clear, separating a resulting crystalline precipitate, adding concentrated aqueous ammonia to said precipitate and heating the mixture to boiling, allowing the reaction mixture to stand at room temperature for several hours, concentrating the solution in vacuum to remove the water, cooling the concentrated solution recrystallizing a final resulting precipitate with anhydrous alcohol and recovering said guanidinium β-mercaptoethanesulfonate.

6. A process of preparing a guanidinium mercaptoalkanesulfonate which comprises reacting an S-thiuronium alkanesulfonate with a compound selected from the group consisting of ammonia and an amine.

7. A process of preparing a salt of a mercaptoalkanesulfonic acid which comprises reacting an alkylene dihalide with an alkali metal sulfite to form a haloalkanesulfonate, reacting said haloalkanesulfonate with thiourea to form an S-thiuronium alkanesulfonate, reacting said S-thiuronium alkanesulfonate with a compound selected from the group consisting of ammonia and an amine to form a guanidinium mercaptoalkanesulfonate, and converting said guanidinium mercaptoalkanesulfonate to a salt of a mercaptoalkanesulfonic acid.

8. A process of preparing a salt of a mercaptoalkanesulfonic acid which comprises reacting a haloalkanesulfonate with thiourea to form a S-thiuronium alkanesulfonate, reacting said S-thiuronium alkanesulfonate with a compound selected from the group consisting of ammonia and an amine to form a guanidinium mercaptoalkanesulfonate, and converting said guanidinium mercaptoalkanesulfonate to a salt of a mercaptoalkanesulfonic acid.

9. A process according to claim 7 in which the guanidinium mercaptoalkanesulfonate is converted to a salt of a mercaptoalkanesulfonic acid by reaction with a nitrate salt.

10. A process according to claim 7 in which the guanidinium mercaptoalkanesulfonate is converted to a salt of a mercaptoalkanesulfonic acid by passing the guanidinium mercaptoalkanesulfonate over a cation exchange resin to form a mercaptoalkanesulfonic acid, and reacting said sulfonic acid with a basic compound.

11. A process according to claim 7 in which the guanidinium mercaptoalkanesulfonate is converted to a salt of a mercaptoalkanesulfonic acid by passing the guanidinium mercaptoalkanesulfonate over a cation exchange resin having a labile cation group other than hydrogen.

12. A process of preparing a mercaptoalkanesulfonic acid which comprises reacting a haloalkanesulfonate with thiourea to form a S-thiuronium alkanesulfonate, reacting said S-thiuronium alkanesulfonate with a compound selected from the group consisting of ammonia and an amine to form a guanidinium mercaptoalkanesulfonate, and passing said guanidinium mercaptoalkanesulfonate over a cation exchange resin to form a mercaptoalkanesulfonic acid.

13. A process of preparing guanidinium β-mercaptoethanesulfonate which comprises reacting β-S-thiuronium ethanesulfonate with ammonia.

14. As a new composition of matter, guanidinium mercaptoalkanesulfonate of the following general formula:

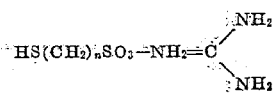

where $n$ is 1 to 5.

15. As a new composition of matter, guanidinium β-mercaptoethanesulfonate of the following formula:

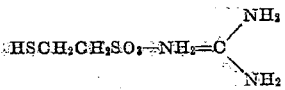

16. A process for the preparation of mercaptoalkanesulfonic acid which comprises reacting an alkylene dihalide with an alkali metal sulfite, removing unreacted dihalide, adding thiourea, heating the second mixture to obtain a crystalline precipitate, adding concentrated aqueous ammonia to the precipitate and heating the mixture, concentrating the solution to obtain guanidinium mercaptoalkanesulfonate, and replacing the guanidinium radical of the resulting compound with hydrogen to form said mercaptoalkanesulfonic acid.

17. A process for the preparation of β-mercaptoethanesulfonic acid which comprises reacting ethylene dihalide with an alkali metal sulfite in an alcohol-water solution, refluxing the mixture, removing unreacted dihalide, adding thiourea, heating the second mixture until the solution is clear, separating a resulting crystalline precipitate, adding concentrated aqueous ammonia to the precipitate and heating the mixture to boiling, allowing the reaction mixture to stand at room temperature for several hours, concentrating the solution in vacuum to remove the water, cooling the concentrated solution, and replacing the guanidinium radical of the resulting compound with hydrogen to form said β-mercaptoethanesulfonic acid.

18. The process according to claim 17 in which said crystalline guanidinium β-mercaptoethanesulfonate is passed in aqueous solution over a body of cation exchange resin to from said β-mercaptoethanesulfonic acid.

19. A process according to claim 18 in which said cation exchange resin is a nuclear sulfonic type ion exchange resin.

20. A process for the preparation of monoethanolammonium β-mercaptoethanesulfonate which comprises reacting ethylene dihalide with an alkali metal sulfite in an alcohol-water solution, refluxing the mixture, removing unreacted dihalide, adding thiourea, heating the second mixture until the solution is clear, separating a resulting crystalline precipitate, adding concentrated aqueous ammonia to the precipitate and heating the mixture to boiling, allowing the reaction mixture to stand at room temperature for several hours, concentrating the solution in vacuum to remove water, cooling the concentrated solution, passing the concentrated aqueous solution through a cation exchange resin, and neutralizing the effluent acidic solution with monoethanolamine to obtain said monoethanolammonium β-mercaptoethanesulfonate.

21. A process for the preparation of sodium β-mercaptoethanesulfonate which comprises reacting ethylene dihalide with an alkali metal sulfite in an alcohol-water solution, refluxing the mixture, removing unreacted dihalide, adding thiourea, heating the second mixture until the solution is clear, separating a resulting crystalline precipitate, adding concentrated aqueous ammonia to the precipitate and heating the mixture to boiling, allowing the reaction mixture to stand at room temperature for several hours, concentrating the solution in vacuum to remove water, cooling the concentrated solution, passing the concentrated aqueous solution through a cation exchange resin, and neutralizing the effluent acidic solution with sodium hydroxide to obtain said sodium β-mercaptoethanesulfonate.

22. A process for the preparation of ammonium β-mercaptoethanesulfonate which comprises reacting ethylene dihalide with an alkali metal sulfite in an alcohol-water solution, refluxing the mixture, removing unreacted dihalide, adding thiourea, heating the second mixture until the solution is clear, separating a resulting crystalline precipitate, adding concentrated aqueous ammonia to the precipitate and heating the mixture to boiling, allowing the reaction mixture to stand at room temperature for several hours, concentrating the solution in vacuum to remove the water, cooling the concentrated solution, passing the concentrated aqueous solution through a cation exchange resin, and neutralizing the effluent acidic solution with ammonium hydroxide to obtain said ammonium β-mercaptoethanesulfonate.

23. A process for the preparation of a mercaptoalkanesulfonate which comprises passing guanidinium mercaptoethanesulfonate over a cation exchange resin possessing a labile cation group.

24. A process of preparing a salt of β-mercaptoethanesulfonic acid the cation of which forms a soluble nitrate, which comprises reacting guanidinium β-mercaptoethanesulfonate with said soluble nitrate of said cation to form said salt of β-mercaptoethanesulfonate and guanidine nitrate which is precipitated.

25. A process of preparing ammonium β-mercaptoethanesulfonate, which comprises reacting guanidinium β-mercaptoethanesulfonate with ammonium nitrate to form ammonium β-mercaptoethanesulfonate and relatively insoluble guanidine nitrate.

References Cited in the file of this patent

UNITED STATES PATENTS

| Number | Name | Date |
| --- | --- | --- |
| 1,888,794 | Ernst et al. | Nov. 22, 1932 |
| 2,459,440 | Lieber et al. | Jan. 18, 1949 |
| 2,559,585 | Beck et al. | July 10, 1951 |